Sept. 25, 1962     H. E. RIORDAN     3,055,636
TURBINE SPEED CONTROL
Filed Oct. 24, 1960

HUGH E. RIORDAN
INVENTOR.

BY Andrew L. Bain
Sal A. Giarratana
ATTORNEYS 3,055,636
TURBINE SPEED CONTROL
Hugh E. Riordan, Wyckoff, N.J., assignor to General Precision Inc., Little Falls, N.J., a corporation of Delaware
Filed Oct. 24, 1960, Ser. No. 64,394
5 Claims. (Cl. 253—82)

The present invention relates to a turbine speed control apparatus and more particularly to a turbine speed control apparatus synchronized with a mechanical or acoustical fixed-frequency oscillator.

In general, one of the fundamental problems in the application of pneumatically driven members, such as gyroscopes, to high precision reference systems is the control of rotor speed to provide constant angular momentum. A speed control apparatus is desirable which eliminates the need for elaborate auxiliary equipment like separate speed sensors and flow control valves, and at the same time provides a capability for very precise control.

The present invention discloses an apparatus utilized for forcing a turbine driven rotor to synchronize with a mechanical or acoustical fixed frequency oscillator. The present invention in its preferred form comprises a single jet reaction turbine surrounded by a circular row of reed type oscillators, wherein all of the reeds are tuned to the required turbine frequency or an appropriate multiple or submultiple thereof. The turbine jet is preferably operated below the critical pressure of the nozzle for the particular gas utilized, in order that the mass flow, and hence, the driving reaction will be more sensitive to change by varying the constriction at the jet opening.

An object of the present invention is the provision of a turbine speed control apparatus synchronized with a mechanical or acoustical fixed frequency oscillator.

Another object is to provide a speed control apparatus for a pneumatically driven rotor to maintain constant angular momentum.

A further object of the invention is the provision of a turbine driven rotor synchronized with a fixed frequency oscillator which controls the mass flow.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
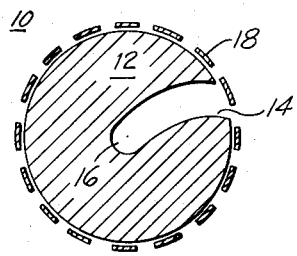
FIGURE 1 is a cross-sectional view of a preferred embodiment of the invention.
Figure 2:
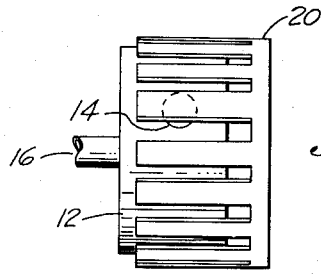
FIGURE 2 is a side view of the apparatus shown in FIGURE 1.

Referring now to the drawings, there is illustrated a preferred embodiment 10 comprising a single jet reaction turbine rotor 12, of the commonly called "lawn sprinkler" variety, provided with a reaction jet 14 supplied through a gas supply port 16 coinciding with the spin axis of the rotor. The rotor is surrounded by a circular row of reed type oscillators 18 all tuned to a predetermined turbine or rotor frequency.

The rotor 12 may be a pneumatically driven gyroscope rotor for application to a high precision reference system and adapted to provide constant angular momentum. Accordingly, the reaction jet 14 which drives the rotor is operatively associated with the plurality of tuned reeds 18 to synchronize the rotor with the fixed frequency acoustical oscillators. The tuned reeds are supported in member 20 which is stationary with respect to the rotor 12. The reeds are all tuned to the required rotor frequency or multiple or submultiple thereof determined by the anticipated operational characteristics of the embodiment. In the case of multiple or submultiple tuning, the relationship between jet position and resonator motion is such as to provide the phase relationships necessary to provide control.

The reaction jet 14 is preferably designed to operate below the critical pressure of its integral nozzle for the particular fluid utilized, in order that the mass flow, and hence the driving reaction, can be highly subject to change by varying the constriction at the opening of the jet by automatically varying the displacement of the reed from the jet opening. If deemed desirable to suppress "hunting" oscillation of the rotor speed around the resonant frequency of the reeds, a predetermined amount of damping of the reed oscillators can be provided. For example, the reeds may be suitably damped by applying mechanical damping to the reeds themselves, or any other similar method which, in all respects, will be a function of the particular application intended for the turbine. In this manner, damping will change the phase versus frequency curve from a step function at resonance to a form having a definite slope and will provide, in effect, synthetic damping of the rotor 12.

Figure 4:
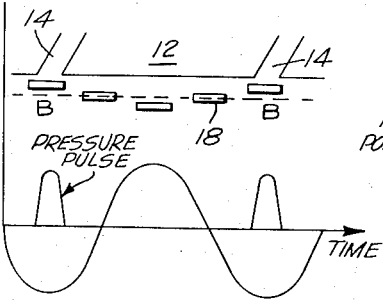
FIGURE 4 is a plot of the operational relationship of the tuned reeds and the reaction jet showing their out-of-phase relation.
Figure 3:
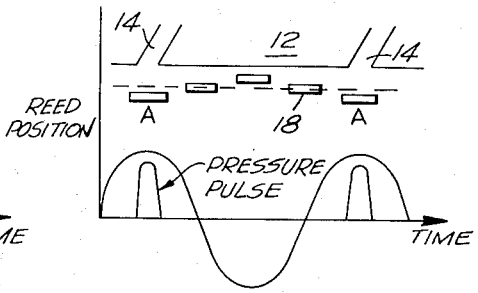
FIGURE 3 is a plot of the operational relationship of the tuned reeds and the reaction jet showing their in-phase relationship.

In considering the operation of the preferred embodiment 10, it would be desirable to disclose the behavior of only one of the reeds 18. Each time that the reed or one of the reeds 18 is passed by the reaction jet 14, it is subjected to a pulse of pressure from the impingement of the fluid escaping from the jet. When the frequency of rotation of the rotor is such that the jet 14 is opposite a reed 18 while the reed is at any point in the path of its natural frequency of vibration between B and A, as represented in FIGS. 3 and 4, at which the reed is receding from the rotor or has just reached its furthest distance from the rotor, the rotor may be considered in phase with the reed so that the reed offers relatively little obstruction to the jet and the mass flow of the jet will be such that the rotor will tend to accelerate. When the frequency of rotation of the rotor is such that the jet 14 is opposite a reed 18 while the reed is at any point in the path of its natural frequency of vibration between A and B, as represented in FIGS. 3 and 4, at which the reed is approaching the rotor or has just reached its closest distance to the rotor the rotor may be considered out of phase with the reed so that the reed offers relatively great obstruction to the jet and the mass flow of the jet will be such that the rotor will tend to decelerate. The speed of the rotor will thus slightly vary so that the jet will range between positions B and tend to an average speed in synchronism with position A.

In brief, slightly below the resonant frequency of the reed, the jet 14 is relatively opened and can be made to accelerate the rotor 12. Slightly above the resonant frequency, the jet is relatively obstructed and the rotor will tend to decelerate. The result is a tendency for the speed of the rotor to synchronize with the oscillation of the reed at its natural frequency. Hence, with the complete circular row of reeds 18, as shown in FIGURE 1, the action of controlling the driving reaction from the jet 14 will be continuous throughout a revolution of the rotor 12.

Figure 5:
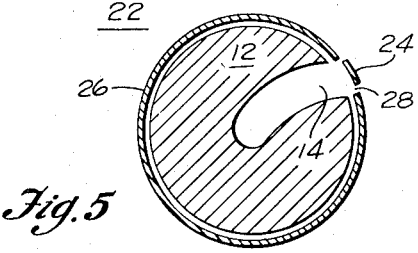
FIGURE 5 is a modification of the apparatus of FIGURE 1.

FIGURE 5 illustrates a modification 22 of the preferred embodiment 10, wherein a single reed 24 is utilized with the rotor 12. In this manner, the driving reaction of the jet 14 will be subject to control through that portion of a revolution when the jet is opposite the reed. Since control with only one reed will be relatively weak, the rotor is provided with a shroud 26 completely enclosing the circumstance of the rotor with the exception of an opening 28 to permit the exposure of the reed 24 to the reaction jet 14. In this manner, with the shrouded rotor full control is provided with the exception of the reduction of the maximum available torque for accelerating the rotor during run-up.

In the operation of the modification 22, each time the reed 24 is passed by the drive jet 14, it will be subjected to a pressure pulse from the impingement of the fluid flow from the jet. Hence, below the natural frequency of the reed 24 the oscillations will be in-phase with the driving pulses of the rotating jet 14, so that the reed will be in its furthest position from the rotor and the jet will be relatively unobstructed. Above the resonant frequency of the reed, the motion of the reed will be substantially 180 degrees out-of-phase with the driving pulses, and hence, the reed will be closer to the rotor as the jet passes to provide a relatively large obstruction to the jet to diminish the reaction force of the jet and reduce the rotor speed.

Accordingly, as in the preferred embodiment 10, below the resonant frequency of the reed 24, the jet is relatively open and can be made to accelerate the rotor, while above the resonant frequency the jet is relatively obstructed and the rotor will tend to decelerate. The result is a tendency for the speed of the rotor to synchronize with the oscillation of the reed at its natural frequency, so that by suitable selection of the natural frequency of the reed to coincide with the desired rotor speed, the speed of the rotor can be suitably controlled.

Figure 6:
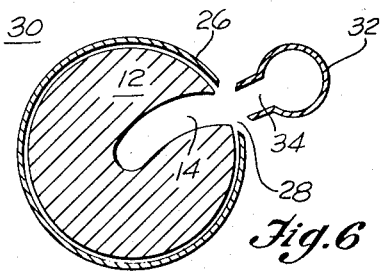
FIGURE 6 is another modification of the apparatus of FIGURE 1.

FIGURE 6 illustrates a modification 30, wherein the single reed 24 of modification 22 is replaced by a Helmholtz resonator 32. In brief, a Helmholtz resonator is an enclosure communicating with the external medium, in this case the reaction jet 14, through an opening 34 of substantially small cross-sectional area. Such a device resonates at a single frequency dependent on the geometry of the resonator. Since in the Helmholtz resonator there is an oscillating flow through the opening 34 which follows the same rules as the motion of the reed oscillator 24 in FIGURE 5, one or more Helmholtz resonators could be used in place of the reeds. In this modification 30, the outflow from the resonator provides a back-pressure to reduce nozzle flow in the same way that obstruction of the jet is obtained by a reed.

Hence, below the resonant frequency of the resonator, the jet 14 is relatively open and can be made to accelerate the rotor 12. At a rotor speed above the resonant frequency of the Helmholtz resonator, the jet 14 is relatively obstructed because of the back-pressure through the outlet 34, and the rotor 12 will tend to decelerate. The result, as in the preferred embodiment, is a tendency for the speed of the rotor to synchronize with the oscillating flow through the outlet 34 corresponding to the natural frequency of the resonator.

Figure 7:
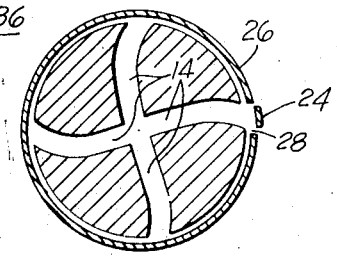
FIGURE 7 is still another modification of the apparatus in FIGURE 1.

FIGURE 7 discloses a modification 36, modifying the shrouded turbine of FIGURE 5 by forming the rotor 12 with a plurality of reaction jets 14. In this modification, the reed oscillator is tuned to the product of the rotor frequency times the number of reaction jets utilized in the rotor. The operation of modification 36 is the same as the operation of the preferred embodiment 10, wherein the speed of the rotor is synchronized with the oscillation of the reed 24 at the natural frequency thereof. Also, if deemed desirable, the reed oscillators can be modified within the scope of the present invention to operate with a liquid instead of a gaseous medium.

In brief, the present invention discloses an apparatus for regulating the speed of a rotor, such as used in gyroscopic instruments, which eliminates the need for elaborate auxiliary equipment while at the same time provides a means for achieving precise control of the turbine speed to obtain constant angular momentum.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. A turbine speed control apparatus adapted to be synchronized with a fixed frequency oscillator, comprising a rotor having integral reaction jet means, a plurality of tuned reeds equally spaced about the periphery of said rotor and radially spaced therefrom located in the exit path of said reaction jet means, pneumatic supply means coupled to said reaction jet means, said reaction jet means operatively coupled with said plurality of tuned reeds, so that at a frequency of rotation of the rotor slightly below the resonant frequency of said reeds the jet is relatively open and can be made to accelerate said rotor, and at a frequency of rotation of the rotor slightly above the resonant frequency of said reeds said reaction jet is relatively obstructed and said rotor will tend to decelerate.

2. A turbine speed control apparatus comprising a rotor member, a reaction jet coupled to said rotor member to rotate said rotor at a set speed, to provide constant angular momentum, oscillator means operatively coupled to said rotor located in the exit path of said reaction jet and co-acting with said reaction jet, said oscillator means tuned to a predetermined rotor frequency to synchronize the speed of said rotor with the natural frequency of said oscillator means.

3. A speed control apparatus comprising a rotor, reaction jet means integral with said rotor, shroud means substantially surrounding said rotor, an opening in said shroud means, oscillator means mounted adjacent said opening, in the exit path of said jet means, so that said reaction jet co-acts with said oscillator means through said opening to control the speed of said rotor as a function of the natural frequency of said oscillator means.

4. A speed control apparatus comprising a rotor having integral reaction jet means, shroud means substantially surrounding said rotor, an opening formed in said shroud means, a Helmholtz resonator having resonant frequency characteristics of such nature as to act with said jet means and having an opening in a juxtaposed position with said shroud opening, so that said reaction jet operatively co-acts with said Helmholtz resonator to control the speed of said rotor as a function of the resonant frequency of said resonator, wherein said resonator provides a back pressure to reduce the jet flow when the speed of said rotor is above the resonant frequency of said resonator.

5. A turbine speed apparatus comprising a rotor having a plurality of reaction jets integral therewith, shroud means surrounding said rotor, an opening in said shroud means, reed means mounted adjacent said shroud opening in the exit path of said jets to operatively co-act with each of said plurality of jets and tuned to a multiple or submultiple of the product of the frequency of said rotor times the number of said reaction jets.

References Cited in the file of this patent

UNITED STATES PATENTS

| | | |
|---|---|---|
| 1,624,093 | Davis | Apr. 12, 1927 |
| 2,719,035 | Morris | Sept. 27, 1955 |
| 2,766,964 | Almquist | Oct. 16, 1956 |
| 2,879,467 | Stern | Mar. 24, 1959 |